United States Patent [19]

Landa

[11] Patent Number: 4,603,766

[45] Date of Patent: Aug. 5, 1986

[54] LEVER OPERATED FRICTION CLUTCH

[76] Inventor: Benzion Landa, 10045 118th St., Edmonton, Alberta, Canada, T5K 1Y1

[21] Appl. No.: 646,235

[22] Filed: Aug. 31, 1984

[51] Int. Cl.[4] ............................................. F16D 23/12
[52] U.S. Cl. .................................... 192/99 S; 192/65; 192/109 R
[58] Field of Search ................. 74/213, 207, 199, 197, 74/196, 194; 192/99 S, 70.3, 66, 65, 107 R, 107 M, 109 R

[56] References Cited

U.S. PATENT DOCUMENTS

| | | | |
|---|---|---|---|
| 1,825,852 | 10/1931 | Casselman | 74/197 |
| 2,698,183 | 12/1954 | Lang | 74/213 X |
| 2,958,229 | 11/1960 | Sorkin | 74/199 |
| 4,344,333 | 8/1982 | Mikina | 74/213 X |
| 4,396,102 | 8/1983 | Beach | 192/99 S |

Primary Examiner—George H. Krizmanich
Attorney, Agent, or Firm—Shenier & O'Connor

[57] ABSTRACT

A low mass clutch in which a thin hard metal disk carried by an output shaft is placed between a driven hardened solid wheel and the outer ring of a ball bearing. The inner ring of the bearing is carried on a shaft connected to a lever. In the quiescent state of the device, the disk and wheel slide relative to each other. To engage the clutch, an electromagnet is energized, exerting a force on the lever causing the ball bearing to exert a relatively high force on the disk. In response, the wheel drives the disk with an extremely rapid angular acceleration.

10 Claims, 2 Drawing Figures

LEVER OPERATED FRICTION CLUTCH

FIELD OF THE INVENTION

My invention relates to the field of clutches, and more particularly to a clutch capable of accelerating a low mass to a very high velocity in an extremely short period of time.

BACKGROUND OF THE INVENTION

One of the problems in accelerating a low mass to a high velocity is that the prime mover must accelerate itself in addition to the driven mass, thus placing a fundamental limit on the acceleration rate of any prime mover. Clutches solve this problem to some extent in that the energy stored in an accelerated high mass prime mover can be transmitted to a load through a clutch which can be engaged relatively rapidly. In clutches of the prior art, driving and driven members, having contact surfaces possessing a high coefficient of friction, are normally held apart in the quiescent state of the clutch to prevent compression of the surfaces. To engage the clutch, the members are moved into engagement by the application of a relatively low force. This required motion, however, creates a time constant which limits the acceleration rate of these clutches.

Sorkin U.S. Pat. No. 2,958,229 issued Sept. 4, 1959, for a variable speed drive discloses a device in which parallel input and output shafts each carry a plurality of thin, flexible hard metal disks. The shafts are positioned so as to form as assembly of overlapping interleaved disks, between which a pair of squeeze rollers are placed. To engage the clutch, the rollers apply a flexural force to the assembly, moving the disks together. The disks engage each other loosely, except along a narrow line of contact between the squeeze rollers enabling one shaft to drive the other. The excessive friction between the loosely engaged portions of the disks together with the required movement thereof impede the rapid acceleration of low mass loads by this device.

SUMMARY OF THE INVENTION

One object of my invention is to provide a low mass clutch which overcomes the defects of those of the prior art.

Another object of my invention is to provide a low mass clutch which is capable of accelerating a low mass to a very high velocity in an extremely short period of time.

Still another object of my invention is to provide a low mass clutch which does not require the acceleration of the driving and driven members toward each other to engage the clutch.

A further object of my invention is to provide a low mass clutch in which the frictional forces opposing a rapid acceleration of the load are minimized.

Other and further objects of my invention will appear from the following description.

BRIEF DESCRIPTION OF THE DRAWINGS

In the accompanying drawings to which reference is made in the instant specification and which are to be read in conjunction therewith, and in which like reference numerals are used to indicate like parts in the various views.

DESCRIPTION OF THE PREFERRED EMBODIMENT

Figure 1:
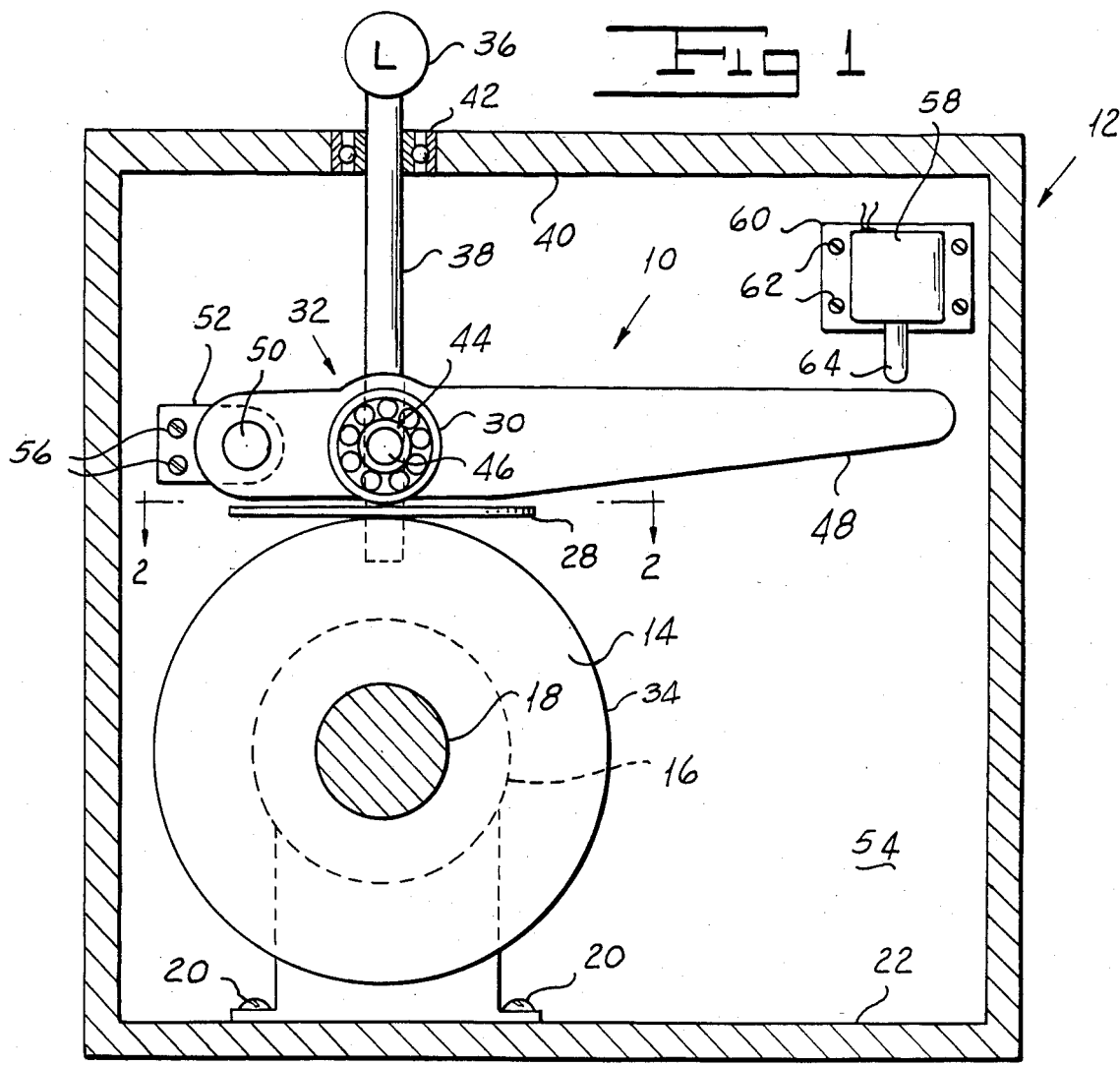
FIG. 1 is a front elevation of my low mass clutch with parts shown in section.
Figure 2:
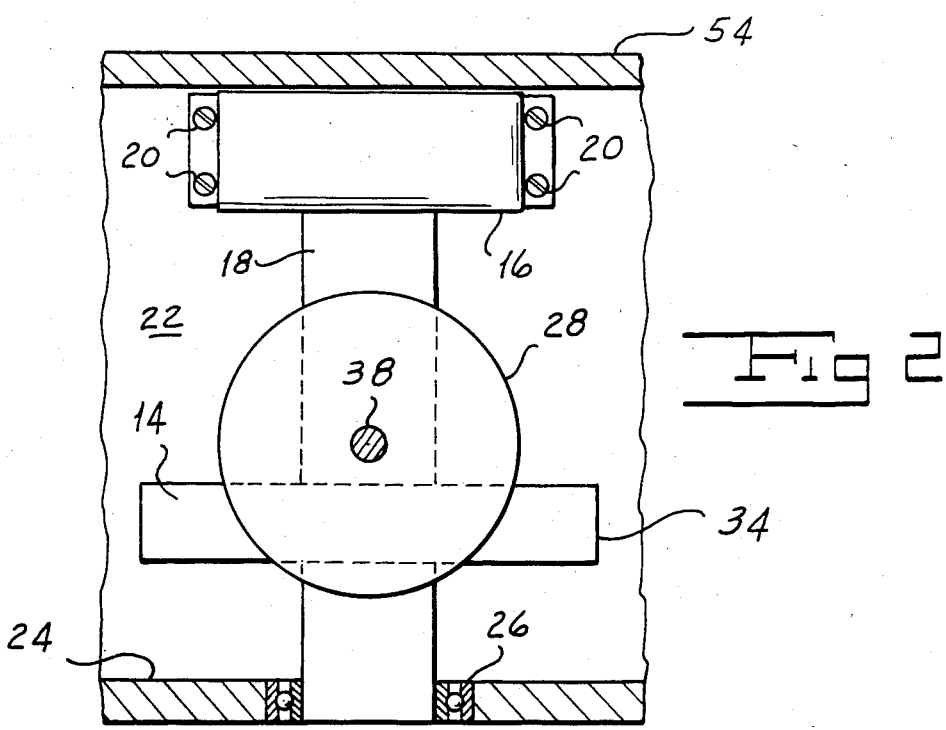
FIG. 2 is a fragmentary plan of my low mass clutch with parts shown in section taken along the line 2—2 of FIG. 1.

Referring now to FIGS. 1 and 2, my low mass clutch, indicated generally by the reference character 10 and shown in a suitable housing 12, includes a solid wheel 14 adapted to be continuously driven by a motor 16 through a shaft 18. I form wheel 14 from a relatively hard material such as steel or I harden the peripheral surface 34 thereof by any suitable means known to the art. Motor 16 is mounted by any suitable means, such for example as screws 20, in the base 22 of the housing 12. Shaft 18 is rotatably supported by a bearing 26 in the front wall 24 of the housing 12.

I position a thin hard metal disk 28 of low mass and minimum elasticity between the wheel 14 and the outer ring 30 of a ball bearing 32, such that one side of the disk 28 is in contact with the ring 30 while the opposite side is in contact with the rim 34 of the wheel 14. As the contact surfaces of the driven wheel 14 and the disk 28 possess a low coefficient of friction, they normally slide relative to each other in the quiescent state of the clutch 10. Upon actuation of the clutch, in a manner to be more fully described hereinbelow, disk 28 is adapted to drive a low mass load 36 through shaft 38 which is supported in a bearing 42 carried by the top wall 40 of the housing 12. Disk 28 may be formed of any suitable material such as stainless steel or the like. The outer ring 30 of bearing 32 may be steel.

The inner ring 44 of ball bearing 32 is carried by a shaft 46 which is mounted on a lever 48. A pivot pin 50 extending from a frame 52 which is secured to the housing 12 by any suitable means, such for example as screws 56, rotatably supports the lever 48 above the disk 28.

I mount an electromagnet 58 above the end of the lever 48 remote from the pivot pin 50, on a frame 60 which is secured to the rear wall 54 of the housing 12 by screws 62. Electromagnet 58 has an armature 64 which is adapted to actuate lever 48 by exerting a force on the end of the lever remote from the pivot pin 50 when the electromagnet is energized. This application of force is transmitted through the lever 48 to the ball bearing 32, causing the outer ring 30 thereof to exert a relatively high clamping force on the disk 28 to clutch it to the wheel 14.

During normal operation of the clutch, wheel 14 is continuously driven by motor 16. In the quiescent state of the clutch, insufficient force is translated by the disk 28 from the wheel 14 to the output shaft 38 to drive the relatively low mass load 36. As the contact surfaces of the wheel 14 and the disk 28 possess a low coefficient of friction, the disk remains stationary, in sliding contact with the rim 34 of the wheel 14.

In order to activate the clutch, electromagnet 58 is energized causing armature 64 to exert a force on the end of the lever 48 remote from the pivot pin 50. In turn, the outer ring 30 of ball bearing 32 exerts a relatively high force on the disk 28, clutching it to the wheel 14 to drive the low mass load 36 with an extremely rapid angular acceleration.

It will be readily appreciated that in both the active and quiescent state of the clutch the driving and driven members remain in contact, and therefore it is not necessary to accelerate them toward each other to engage the clutch. When the clutch is activated, an electrical signal is translated into a force rather than into a motion. This is accomplished in a very short period of time by the use of a triggering mechanism with an extremely low inductive time constant.

It will be seen that I have accomplished the objects of my invention. I have provided a low mass clutch which is capable of accelerating a low mass to a very high velocity in an extremely short period of time. My clutch does not require the acceleration of the driving and driven members toward each other in order to engage the clutch, and my clutch minimizes the frictional forces opposing a rapid acceleration of the load.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A clutch for coupling a prime mover to a load including in combination a first member connected to said prime mover for movement therewith, a second member connected to said load for movement therewith, said first and second members having respective first and second hard surfaces having a low coefficient of friction therebetween, means mounting said members relative to each other with said surfaces in contact, said surface coefficient of friction being such that said second surface slides relative to said first surface with said prime mover in operation without being driven thereby, said second member having a third surface opposite to said second surface, a third member in contact with said third surface, and actuatable means for exerting a force on said third member.

2. A clutch for coupling a prime mover to a load including in combination a first member connected to said prime mover for movement therewith, a second member connected to said load for movement therewith, said members having respective hard surfaces with a low coefficient of friction therebetween, means mounting said members relative to each other with said surfaces in contact, said surface coefficient of friction being such that said second surface slides relative to said first surface with said prime mover in operation without being driven thereby, and actuatable means for clamping said surfaces into engagement to couple said load to said prime mover.

3. A clutch for coupling a prime mover to a load including in combination a wheel connected to said prime mover for movement therewith, said wheel having a hard peripheral surface, a disk connected to said load for movement therewith, said disk being formed of a hard material having a low coefficient of friction with said surface of said wheel, means mounting said wheel and said disk with the surface of a face of said disk in contact with the peripheral surface of said wheel, said coefficient of friction being such that said disk slides relative to said wheel with said prime mover in operation without being driven thereby, and actuatable means for clamping said disk to said wheel to clutch said prime mover to said load.

4. A clutch for coupling a prime mover to a load including in combination a wheel connected to said prime mover for movement therewith, said wheel having a hard peripheral surface, a disk connected to said load for movement therewith, said disk being formed of a hard material having a low coefficient of friction with said surface of said wheel, means mounting said wheel and said disk with the surface of a first face of said disk in contact with the peripheral surface of said wheel, a ring in contact with the surface of the other face of said disk at a location opposite to said wheel, said coefficient of friction being such that said disk slides relative to said wheel with said prime mover in operation without being driven thereby, and actuatable means for exerting a force on said ring to clamp said disk to said wheel to clutch said prime mover to said load.

5. A clutch as in claim 4 in which said actuatable means comprises a lever, means mounting said ring for rotary movement on said lever at a location intermediate the ends thereof, means mounting said lever for pivotal movement about an end thereof with said ring in engagement with said disk, and means for applying a force to said lever adjacent to the end thereof.

6. A clutch for coupling a prime mover to a load including in combination a wheel adapted to be driven by said prime mover, a disk adapted to drive said load, means mounting said wheel and said disk with the surface of a face of said disk in contact with the peripheral surface of said wheel, and electrically actuated means for clamping said disk to said wheel to couple said prime mover to said load, the coefficient of friction between said surfaces being such that said disk slips relative to said wheel without being driven thereby in the absence of actuatation of said clamping means.

7. Apparatus as in claim 6 including a prime mover coupled to said wheel.

8. Apparatus as in claim 6 including a load coupled to said disk.

9. Apparatus as in claim 6 including a prime mover coupled to said wheel and a load coupled to said disk.

10. Apparatus as in claim 6 in which said clamping means comprises an armature of magnetically permeable material, electrically controlled means for exerting a magnetic force on said armature, and means for transmitting said force to said disk.

* * * * *